(12) United States Patent
Sitter, Jr.

(10) Patent No.: US 10,394,007 B2
(45) Date of Patent: Aug. 27, 2019

(54) REFLECTIVE OPTICAL CONFIGURATIONS WITH PRESCRIBED OPTICAL FIELD MAPPINGS FOR BACK-SCANNED IMAGERS

(71) Applicant: RAYTHEON COMPANY, Waltham, MA (US)

(72) Inventor: David N. Sitter, Jr., Torrance, CA (US)

(73) Assignee: RAYTHEON COMPANY, Waltham, MA (US)

(*) Notice: Subject to any disclaimer, the term of this patent is extended or adjusted under 35 U.S.C. 154(b) by 203 days.

(21) Appl. No.: 15/785,564

(22) Filed: Oct. 17, 2017

(65) Prior Publication Data
US 2019/0113736 A1 Apr. 18, 2019

(51) Int. Cl.
G02B 17/06 (2006.01)
G02B 13/14 (2006.01)
G02B 23/02 (2006.01)

(52) U.S. Cl.
CPC ....... *G02B 17/0663* (2013.01); *G02B 13/146* (2013.01); *G02B 23/02* (2013.01)

(58) Field of Classification Search
CPC ...... G02B 17/06; G02B 17/0647–0663; G02B 13/14; G02B 13/146; G02B 23/00; G02B 23/02; G02B 23/06
See application file for complete search history.

(56) References Cited

U.S. PATENT DOCUMENTS

| 4,733,955 A | 3/1988 | Cook |
| 4,804,258 A | 2/1989 | Kebo |
| 5,071,240 A | 12/1991 | Ichihara et al. |
| 5,078,502 A | 1/1992 | Cook |
| 5,363,235 A | 11/1994 | Kiunke et al. |
| 5,526,181 A | 6/1996 | Kunick et al. |
| 5,663,825 A | 9/1997 | Amon et al. |
| 5,812,323 A | 9/1998 | Takahashi |
| 6,016,220 A | 1/2000 | Cook |
| 6,178,047 B1 | 1/2001 | Cook |

(Continued)

FOREIGN PATENT DOCUMENTS

| EP | 0766113 A2 | 4/1997 |
| EP | 2242250 A1 | 10/2010 |

(Continued)

OTHER PUBLICATIONS

Thibault, Simon, Optical design of an hemispherical, long-wave infrared panomorph lens for total situational awareness, May 7, 2009, Proc. SPIE, vol. 7298, pp. 72980Y-1 to 72980Y-9.

(Continued)

*Primary Examiner* — Derek S. Chapel
*Assistant Examiner* — Adam W Booher
(74) *Attorney, Agent, or Firm* — Lando & Anastasi, LLP

(57) ABSTRACT

Optimal angular field mappings that provide the highest contrast images for back-scanned imaging are given. The mapping can be implemented for back-scanned imaging with afocal optics including an anamorphic field correcting assembly configured to implement a non-rotationally symmetric field mapping between object space and image space to adjust distortion characteristics of the afocal optics to control image wander on a focal plane array. The anamorphic field correcting assembly can include one or more mirrors having non-rotationally symmetric aspherical departures.

15 Claims, 9 Drawing Sheets

(56) References Cited

U.S. PATENT DOCUMENTS

| | | |
|---|---|---|
| 6,342,967 B1 | 1/2002 | Wilczynski |
| 6,426,834 B1 | 7/2002 | Braunecker et al. |
| 7,119,969 B1 | 10/2006 | Amon et al. |
| 8,102,583 B2 | 1/2012 | Cook |
| 10,078,201 B2 | 9/2018 | Neil |
| 2003/0067691 A1 | 4/2003 | Kurematsu et al. |
| 2003/0179444 A1 | 9/2003 | Cook |
| 2012/0176671 A1 | 7/2012 | Cook |
| 2012/0200700 A1 | 8/2012 | Bennett et al. |
| 2012/0300276 A1 | 11/2012 | Ohnishi |
| 2014/0240820 A1 | 8/2014 | Sitter, Jr. |

FOREIGN PATENT DOCUMENTS

| | | |
|---|---|---|
| EP | 2525235 A1 | 11/2012 |
| WO | 9921043 A1 | 4/1999 |
| WO | 2012/020413 A1 | 2/2012 |

OTHER PUBLICATIONS

International Search Report and Written Opinion in application No. PCT/US2018/035061 dated Aug. 14, 2018.

| Surface | Element | Surface Type | Radius | CC | Dec/Tilt Type | YDE | ADE, deg | Thickness | Matl. | Aperture Rad | Aperture Rex | Aperture Rey | Aperture Yoffset |
|---|---|---|---|---|---|---|---|---|---|---|---|---|---|
| 0 | Object | | Infinity | | | | | | Air | | | | |
| 1 | Stop | | Infinity | | | | | 2.999995 | Air | 0.5 | | | |
| 2 | Offset/Tilt | | Infinity | | Basic | 8.643601 | 40.000000 | | Air | | | | |
| 3 | M1 | XYP | -19.217260 | -0.106002 | DAR | -0.171808 | 1.563321 | -5.028490 | Refl | | 1.65 | 1.5 | -9.15 |
| 4 | M2 | XYP | -8.232931 | -0.471307 | DAR | -0.943064 | 8.789648 | 7.941462 | Refl | | 1.45 | 1.12 | -6.52 |
| 5 | M3 | XYP | -20.939792 | -0.227444 | DAR | 3.479217 | 3.104346 | -15.115169 | Refl | | 3.4 | 2.1 | -17.5 |
| 6 | Offset/Tilt | | Infinity | | Basic | -19.269685 | -29.047342 | | Air | | | | |
| 7 | Image | | Infinity | | | | | -15.115169 | Air | | | | |
| 8 | Untilt | | Infinity | | Basic | | 29.047342 | | Air | | | | |
| 9 | Unoffset | | Infinity | | Basic | -19.269685 | | | Air | | | | |
| 10 | M4 | XYP | 20.939792 | -0.152177 | DAR | -3.479217 | 3.104346 | 7.941462 | Refl | | 3.4 | 2.1 | 17.3 |
| 11 | M5 | XYP | 8.232931 | -0.443906 | DAR | 0.943064 | 8.789648 | -5.028490 | Refl | | 1.45 | 1.12 | 6.52 |
| 12 | M6 | XYP | 19.217260 | -0.106002 | DAR | 0.171808 | 1.563321 | | Refl | | 1.65 | 1.5 | 9.15 |
| 13 | Tilt | | | | Basic | | -40.000000 | | | | | | |
| 14 | Offset | | | | Basic | 8.643601 | | 2.999995 | | | | | |
| 15 | Exit Pupil | | | | | | | | | 0.53 | | | |

FIG. 10

| Monomial | Coef | Element | | | | | |
|---|---|---|---|---|---|---|---|
| | | M1 | M2 | M3 | M4 | M5 | M1 (again) |
| Y | C3 | 3.492700E-02 | 9.910011E-02 | 1.614871E-03 | 5.916700E-02 | 5.859632E-02 | 3.492700E-02 |
| $X^2$ | C4 | -1.934216E-03 | -1.098684E-02 | 5.627021E-03 | -8.702559E-03 | -1.346055E-03 | 1.934216E-03 |
| $Y^2$ | C6 | 7.784711E-04 | -4.620106E-03 | 4.331927E-04 | 4.553102E-04 | 1.488081E-02 | -7.784711E-04 |
| $X^2Y$ | C8 | -2.619911E-04 | -1.056811E-03 | 3.049439E-04 | -2.685502E-04 | -2.870377E-03 | -2.619911E-04 |
| $Y^3$ | C10 | -8.289597E-05 | 1.018980E-03 | 1.917786E-04 | -1.300195E-04 | -3.542620E-04 | -8.289597E-05 |
| $X^4$ | C11 | 9.063494E-05 | 1.324151E-03 | 3.022802E-04 | -4.176892E-04 | 9.251770E-04 | -9.063494E-05 |
| $X^2Y^2$ | C13 | 3.535011E-06 | -1.041653E-07 | -1.906789E-05 | 5.000510E-06 | 1.621916E-04 | -3.535011E-06 |
| $Y^4$ | C15 | -1.661060E-06 | 1.189946E-06 | 3.102466E-06 | -1.109225E-06 | 2.168802E-06 | 1.661060E-06 |
| $X^4Y$ | C17 | -2.656820E-05 | -5.115428E-04 | -2.319615E-06 | -5.155089E-06 | -9.913176E-04 | -2.656820E-05 |
| $X^2Y^3$ | C19 | -3.738572E-07 | -7.308007E-06 | -1.994300E-08 | 1.332101E-07 | 4.806558E-05 | -3.738572E-07 |
| $Y^5$ | C21 | 7.540208E-08 | -1.295564E-05 | -3.369654E-07 | 2.609112E-07 | 8.240970E-06 | 7.540208E-08 |
| $X^6$ | C22 | 1.410883E-05 | 6.101473E-05 | 9.931060E-07 | -5.761441E-06 | 1.551141E-04 | -1.410883E-05 |
| $X^4Y^2$ | C24 | -1.436530E-06 | -8.552642E-05 | -1.148566E-06 | 9.070988E-07 | 1.963299E-05 | 1.436530E-06 |
| $X^2Y^4$ | C26 | -2.177417E-07 | -7.998144E-06 | 1.203161E-08 | 1.112242E-07 | 4.675638E-06 | 2.177417E-07 |
| $Y^6$ | C28 | -1.615020E-10 | -3.617686E-08 | -6.980208E-09 | 3.654445E-09 | -6.746841E-07 | 1.615020E-10 |
| $X^6Y$ | C30 | 8.059788E-06 | 9.648325E-05 | 4.613262E-07 | 1.418125E-06 | 2.114622E-05 | 8.059788E-06 |
| $X^4Y^3$ | C32 | 5.207373E-07 | 8.657317E-06 | -3.302112E-09 | 3.302417E-08 | 2.892128E-05 | 5.207373E-07 |
| $X^2Y^5$ | C34 | 2.587794E-08 | 2.170312E-07 | -2.253159E-09 | 1.315304E-09 | -7.307070E-07 | 2.587794E-08 |
| $Y^7$ | C36 | -2.927436E-10 | 6.904972E-08 | 1.461319E-10 | -2.449446E-11 | -5.283634E-08 | -2.927436E-10 |
| $X^8$ | C37 | 3.166348E-07 | 9.224885E-06 | 2.791559E-08 | -8.182827E-08 | -6.293109E-06 | -3.166348E-07 |
| $X^6Y^2$ | C39 | 6.919440E-07 | 1.170737E-05 | 2.049483E-08 | -6.215311E-08 | -5.932886E-06 | -6.919440E-07 |
| $X^4Y^4$ | C41 | 2.759070E-08 | 5.802560E-07 | -5.459804E-10 | 6.347030E-10 | -1.738324E-06 | -2.759070E-08 |
| $X^2Y^6$ | C43 | 2.697985E-09 | 3.585572E-08 | -2.279325E-10 | -1.919640E-10 | 4.260111E-08 | -2.697985E-09 |
| $Y^8$ | C45 | 3.342812E-11 | -1.451783E-09 | 3.896529E-13 | -6.258855E-12 | 1.206486E-08 | -3.342812E-11 |

FIG. 11

REFLECTIVE OPTICAL CONFIGURATIONS WITH PRESCRIBED OPTICAL FIELD MAPPINGS FOR BACK-SCANNED IMAGERS

BACKGROUND

In certain imaging applications, such as infrared search sensors, for example, it is desirable for the imaging sensor to scan large fields of regard at a high rate and with diffraction limited performance. Approaches to achieving these goals include using back-scanned sensors, or line-scan imagers with large fields of view. In order to increase the integration time for a scanned two-dimensional (2-D) imaging sensor, the technique of back-scanning is often used to provide step/stare coverage. FIG. 1 illustrates this concept.

Referring to FIG. 1 there is illustrated a block diagram of one example of a sensor system in which an afocal telescope 110 is configured to receive incoming electromagnetic radiation 120 and direct the radiation via imaging optics 130 to an imaging sensor 140, which is frequently a focal plane array (FPA). Back-scanning with a mirror 150 behind the afocal telescope 110 provides an agile method to increase the integration time for the FPA 140 by at least partially compensating for movement of the sensor system. Specifically, as the system scans in object space over an angular range θ, the back-scan mirror 150 tilts to attempt to keep the image fixed on the FPA 140 during the integration time. Thus, the larger sensor system, or a portion thereof, may be scanned at the nominal rate while the smaller back-scan mirror 150 provides the fast motions to implement the step/stare function. This is further illustrated in FIGS. 2A-2B.

Referring to FIG. 2A, there is illustrated a schematic representation of the back-scanned sensor's field of view (i.e., field of view of the sensor 140) within the field of view 210 of the afocal telescope 110. The sensor's field of view is scanned through the afocal telescope's field of view 210, as represented by arrow 220. Box 230a represents the sensor's field of view at a first or earlier point in time, with a corresponding target point position 235a, and box 230b represents the sensor's field of view at a second or later point in time, with a corresponding target point position 235b. The target point 235 effectively sweeps through the telescope's field of view 210 during the back-scan operation. FIG. 2B shows the corresponding back-scanned sensor field of view 230 in object space. In FIG. 2B, the field of view 210 of the afocal telescope 110 is scanning to the right, as represented by arrow 240, while the back-scan mirror 150 moves to keep the field of view 230 of the FPA 140 fixed during the integration time (also referred to as exposure time). Back-scanning holds the sensor field of view 230 fixed in object space as the afocal telescope field of view 210 scans.

SUMMARY OF INVENTION

Although back-scanning can hold one field point, e.g., target point 235, relatively stable on the focal plane array (FPA), all other field points may wander during the exposure due to imaging distortion characteristics of the afocal telescope. Aspects and embodiments are directed to optimal field mappings, which can be implemented in reflective optical configurations with controlled distortion characteristics, for back-scanned and line-scanned imagers that reduce field point wander and the associated image blurring to achieve broad-band, wide field-of-view back-scanned imaging. As discussed in more detail below, certain embodiments are directed to a large field-of-view, unobscured, all-reflective afocal relay configured to implement a prescribed angular field mapping that reduces image blurring. Certain examples of the afocal relay include six mirrors, each having general aspheric departures (also referred to as "free-form" optical shapes).

According to one embodiment, an optical imaging system configured for back-scanned imagery comprises an imaging sensor, an imager configured to focus electromagnetic radiation onto the imaging sensor, the imaging sensor being configured to form an image from the electromagnetic radiation, and afocal optics configured to receive the electromagnetic radiation and to direct the electromagnetic radiation via an exit pupil of the afocal optics to the imager. The afocal optics includes an all-reflective telescope configured to receive the electromagnetic radiation and an all-reflective afocal pupil relay positioned between the all-reflective telescope and the exit pupil of the afocal optics and configured to re-image the electromagnetic radiation to the exit pupil. The all-reflective afocal pupil relay includes a plurality of anamorphic field-correcting mirrors configured to implement a non-rotationally symmetric field mapping between object space and image space to set distortion characteristics of the afocal optics to control image wander on the imaging sensor for off-axis image points during a back-scan operation. The optical imaging system further comprises a back-scan mirror positioned proximate the exit pupil of the afocal optics and between the afocal optics and the imager, and configured to perform the back-scan operation to stabilize the image on the imaging sensor.

In one example the all-reflective telescope is configured to implement a rotationally symmetric field mapping. In one example the all-reflective telescope is a five mirror anastigmat.

The optical imaging system may further comprise a head mirror positioned on an object space side of the afocal optics and configured to scan a field-of-view of the telescope over a field of regard, which may be larger than the field-of-view. In one example the afocal optics further includes a derotation element positioned between the all-reflective telescope and the all-reflective pupil relay.

In one example the plurality of anamorphic field-correcting mirrors of the all-reflective afocal pupil relay includes six mirrors. In another example each of the six mirrors has at least one surface having a non-rotationally symmetric aspherical departure. In another example the six mirrors include a first pair of identical mirrors, a second pair of identical mirrors, and two additional mirrors having unique surface shapes different from both the first and second pairs of mirrors. In another example the six mirrors includes a first group of three mirrors configured to receive the electromagnetic radiation and to form an intermediate image, and a second group of three mirrors configured to direct and recollimate the electromagnetic radiation from the intermediate image to the exit pupil to provide a collimated beam of the electromagnetic radiation at the exit pupil.

In one example the non-rotationally symmetric field mapping is defined by $\theta_i = A_{mag}\theta_0$ and $\phi_i = A_{mag}\phi_0$, wherein $\theta_i$ and $\phi_i$ are ray angles in image space, $\theta_o$ and $\phi_o$ are ray angles in object space, and $A_{mag}$ is a magnification of the afocal optics.

In another example the imaging sensor is a focal plane array having a two-dimensional array of imaging pixels.

According to another embodiment an all-reflective afocal pupil relay is configured to implement non-rotationally symmetric field mapping between object space and image space. The all-reflective afocal pupil relay comprises a first mirror configured to receive collimated electromagnetic radiation from an entrance pupil of the all-reflective afocal pupil relay and to reflect the electromagnetic radiation, a second mirror configured to receive the electromagnetic radiation reflected from the first mirror and to further reflect the electromagnetic radiation, a third mirror configured to receive the electromagnetic radiation reflected from the second mirror and to reflect and focus the electromagnetic radiation to form an intermediate image at an intermediate image plane, a fourth mirror configured to receive the electromagnetic radiation from the intermediate image plane and to further reflect the electromagnetic radiation, a fifth mirror configured to receive the electromagnetic radiation reflected from the fourth mirror and to further reflect the electromagnetic radiation, and a sixth mirror configured to receive the electromagnetic radiation reflected from the fifth mirror and to recollimate the electromagnetic radiation to provide a collimated beam of the electromagnetic radiation at an exit pupil of the all-reflective afocal pupil relay, wherein each of the first, second, third, fourth, fifth, and sixth mirrors has a conic surface with an aspheric departure to implement the non-rotationally symmetric field mapping.

In one example the first and sixth mirrors are identical. In another example the second and fifth mirrors are identical.

In one example the non-rotationally symmetric field mapping is defined by $\theta_i = A_{mag}\theta_o$ and $\phi_i = A_{mag}\phi_o$, wherein $\theta_i$ and $\phi_i$ are ray angles in image space, $\theta_o$ and $\phi_o$ are ray angles in object space, and $A_{mag}$ is a magnification of afocal optics in which the all-reflective afocal pupil relay is included.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 10 is a table showing an example of an optical prescription for an embodiment of the afocal pupil relay shown in FIG. 7, according to aspects of the present invention; and FIG. 11 is a table showing aspheric coefficients for the mirror surfaces of the example of the optical prescription given in FIG. 10, according to aspects of the present invention.

DETAILED DESCRIPTION

As discussed above, back-scanned imagers or line-scanned imagers with large fields of view can be used to achieve scanning of the sensor field of view over a large field of regard at a high rate and with diffraction limited performance. However, standard optical design forms introduce image blurring for off-axis field points during the exposure/integration time, which lowers the signal to noise ratio of the target signal.

Figure 1:
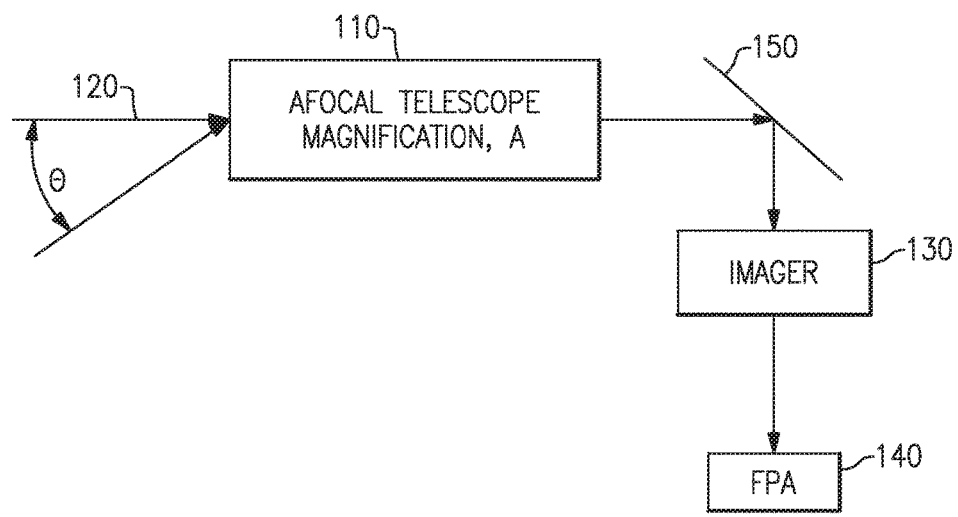
FIG. 1 is a schematic diagram of one example of a step/stare sensor configuration including an afocal telescope and a back-scan mirror configured to implement back-scanned imaging.
Figure 2A:
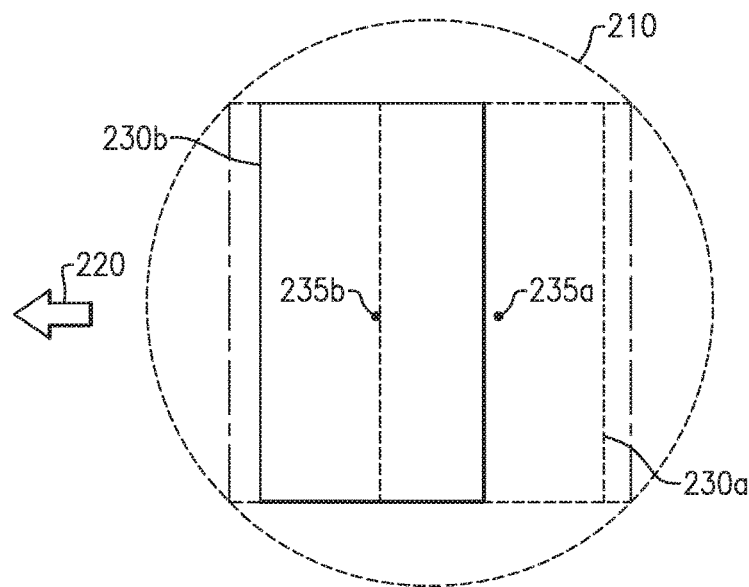
FIG. 2A is a diagram illustrating an example of a sensor's field of view within the field of view of an afocal telescope.
Figure 2B:
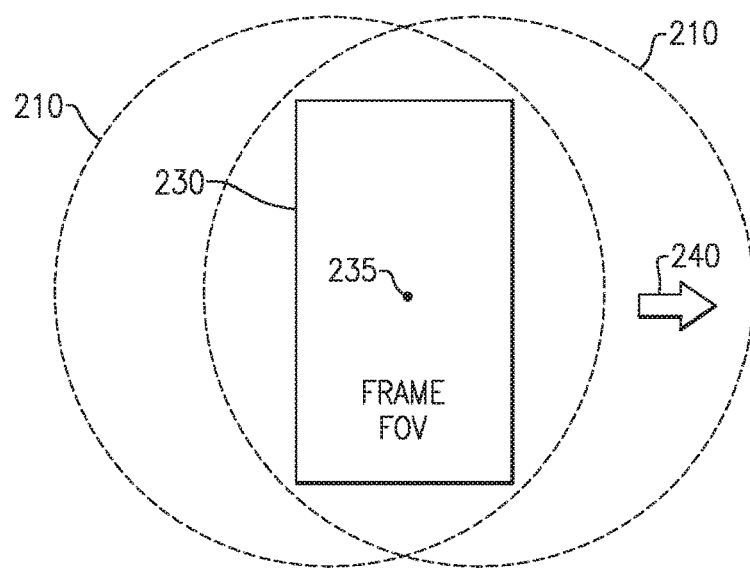
FIG. 2B is a diagram showing the back-scanned sensor field of view in object space corresponding to FIG. 2A.
Figure 3:
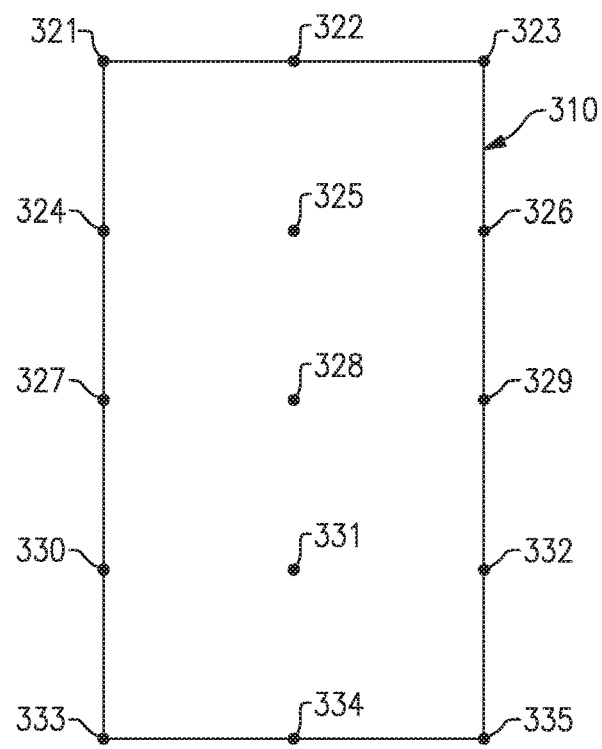
FIG. 3 is a diagram illustrating an example of a sensor's field of view in object space, showing a plurality of field points.

To further demonstrate the issue of image wander, the following examples consider the case of an infrared search sensor. FIG. 3 schematically illustrates an example of a nominal sensor frame field-of-view (FOV) 310 of an exemplary sensor in object space, showing the locations of a plurality of field points 321-335. The field points include top left 321, top 322, top right 323, left top middle 324, top middle 325, right top middle 326, left 327, on-axis (center) 328, right 329, left bottom middle 330, bottom middle 331, right bottom middle 332, bottom left 333, bottom 334, and bottom right 335. Although the back-scan mirror can hold one field point, typically the central or on-axis field point 328, relatively stable on the focal plane array (FPA), all other field points may wander during the exposure due to imaging distortion characteristics of the afocal telescope.

The optimal field mapping for one-dimensional (1-D) scanning (e.g., horizontal scanning of a laser spot beam) is well known. For afocal systems, the 1-D optical field mapping is defined based on the angular relationship between rays entering the telescope ($\theta_i$) and leaving the telescope ($\theta_o$), and is given by:

$$\theta_i = A_{mag}\theta_o \quad (1)$$

In Equation (1), $A_{mag}$ is the angular magnification of the afocal telescope. A similar relationship applies for focal systems, replacing $A_{mag}$ with F, the focal length of the system. The optimal 1-D field mapping is not ideal for two-dimensional (2-D) imaging systems. The field mapping of Equation (1) minimizes image wander for field points along a single axis. Accordingly, line-scan systems can use this mapping and achieve adequate results. However, back-scanned systems that include two-dimensional imaging sensors (such as an FPA) with conventional optical design forms suffer significant blurring and reduced signal to noise ratio. The amount and significance of the blurring depends on the magnification of the afocal telescope, the angular field of view, and the number of pixels (on the FPA) across the field of view.

Although the field mapping of Equation (1) can be used, afocal telescopes in 2-D imaging systems are generally optimized to have zero distortion based on the angular relationship between rays entering the telescope ($\theta_i$) and leaving the telescope ($\theta_o$) satisfying the following equation:

$$\tan(\theta_i) = A_{mag} \tan(\theta_o) \quad (2)$$

The relationship of Equation (2) ensures distortion-free images (e.g., lines are imaged to lines). However, similar to configurations designed according to Equation (1), when a back-scan mirror is placed behind the afocal telescope, this relationship introduces image wander or blur for off-axis field points during the exposure. The amount and significance of the blurring again depends on the magnification of the afocal telescope, the angular field of view, and the number of pixels (on the FPA) across the field of view.

Imaging aberrations may also introduce additional image blurring. It is to be appreciated that for a system that does not implement back-scanning, the imaging distortion of an afocal telescope is typically a separate issue from image quality. For example, the image may be sharp, but appear to be distorted. As discussed in more detail below, aspects and embodiments are directed to optical design forms that implement optimal field mappings for back-scanned and line-scanned sensors such that imaged field points do not move during the integration time and image blurring can be mitigated.

Figure 4:
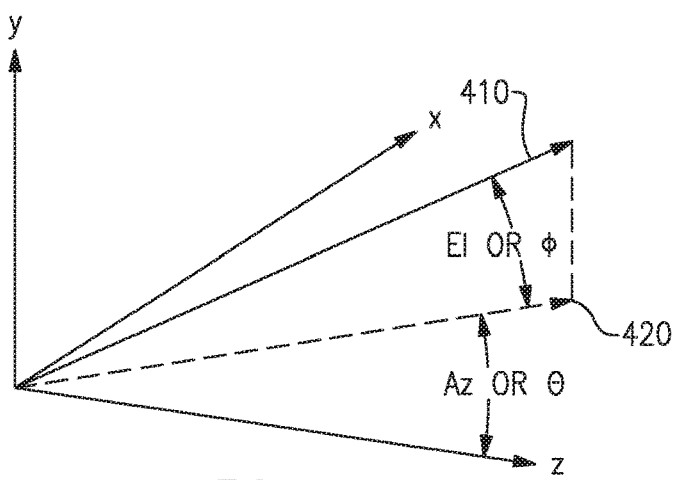
FIG. 4 is a diagram illustrating an example of a polar coordinate system.

As discussed in co-pending, commonly-owned U.S. application Ser. No. 15/098,769 titled "OPTICAL CONFIGURATIONS FOR OPTICAL FIELD MAPPINGS FOR BACK-SCANNED AND LINE-SCANNED IMAGERS" and filed on Apr. 14, 2016 ("the '769 application"), which is herein incorporated by reference in its entirety for all purposes, aspects and embodiments provide an optimal field mapping for back-scanned optical systems that is based on a polar coordinate system. An example of the polar coordinate system is illustrated in FIG. 4. Rays to/from distant objects can be defined according to azimuth (Az) and elevation (El) angles. In this coordinate system, the azimuth angle is denoted herein as $\theta$ and is measured from the z-axis (optical axis) to the projected ray 420. The elevation angle is denoted herein as $\phi$, and is the angle of the ray 410 measured from the x-y plane, not the angle from the z-axis to the ray 420 projected onto the y-z plane. For the purposes of explanation, the following discussion assumes scanning to be in the azimuth direction; however, those skilled in the art will readily appreciate, given the benefit of this disclosure, the alterations to account for scanning in the elevation direction instead.

As discussed in the '769 application, according to certain embodiments, the optimal field mapping from object space to image space of an afocal telescope is given by:

$$\theta_i = A_{mag} \theta_o \quad (3)$$

$$\phi_i = A_{mag} \phi_o \quad (4)$$

Those skilled in the art will appreciate, given the benefit of this disclosure, that $A_{mag}=1$ is the degenerate case where there is no difference between the mapping of Equations (4) and (4) and the conventional mappings of Equations (1) and (2); however, generally and in a wide variety of applications, a non-unity magnification is desired. Unlike the conventional field mappings of Equations (1) and (2), the optimal field mapping according to Equations (3) and (4) is not rotationally symmetric. It has an anamorphic nature. As discussed further below, this optimal field mapping removes field point motion during back-scan. Equations (3) and (4) match the paraxial scaling equations of an afocal telescope. Thus, this optimal field mapping implements angular magnification of an afocal telescope in two orthogonal directions. In other words, an angular shift in $\theta_o$ (which is an azimuth rotation and the scanning motion that is desirably implemented in operation of the system) introduces a simple, but scaled due to the magnification $A_{mag}$, shift in $\theta_i$ for all rays in image space. An angular shift in $\theta_o$ produces no change in the ray elevation angles ($\phi_i$) in image space.

The '769 application provides examples of refractive optical systems that implement the optimal field mapping according to Equations (3) and (4) and have very little image wander during back-scan for all field points across the sensor, and therefor achieve vastly reduced image blur relative to comparable conventional systems. However, because the optical systems disclosed in the '769 application are refractive, they may have limited spectral coverage. Aspects and embodiments disclosed herein provide examples of reflective optical systems that implement the optimal field mapping according to Equations (3) and (4) to provide enhanced imaging over a broad spectral range. In particular, certain aspects and embodiments provide reflective optical systems configured to enable sensor operation over the mid-wave infrared (MWIR) and long-wave infrared (LWIR) spectral bands.

Figure 5:
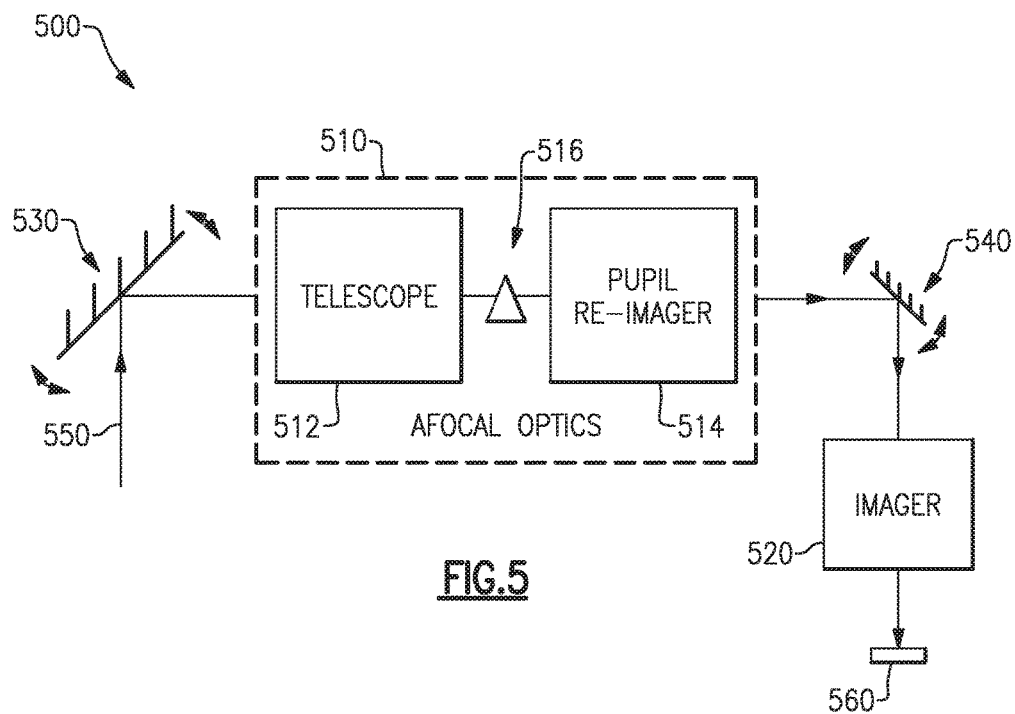
FIG. 5 is a block diagram of one example of a back-scanned imaging system according to aspects of the present invention.

FIG. 5 is a block diagram illustrating one example of the functional layout of a back-scanned optical imaging system 500, as may be used for infrared search applications, for example. The optical imaging system 500 includes afocal optics 510, an imager 520, a head mirror 530 positioned on the object space side of the afocal optics 510, and a back-scan mirror 540 positioned between the afocal optics 510 and the imager 520. The afocal optics 510 receives electromagnetic radiation 550 from a viewed scene via the head mirror 530, and directs the radiation to the imager 520, which focuses the radiation onto an imaging sensor 560 (e.g., an FPA). The optimal angular field mapping discussed above can be applied to the design of the afocal optics 510, as discussed in more detail below. The afocal optics 510 includes an all-reflective telescope 512, an all-reflective pupil re-imager 514 (also referred to as an all-reflective pupil relay), and a derotation element 516 positioned between the telescope 512 and the pupil re-imager 514. The head mirror 530 implements the nominal scan of the system field-of-view. In this case, the image will rotate through the telescope 512 if the head mirror 530 rotates out of the plane of incidence. The derotation element 516 restores the image orientation for the back-scan operation. The derotation element 516 can be a derotation prism, for example. In certain examples the exit pupil of the telescope 512 is located close to the derotation element 516 to keep the derotation element as small as possible. The pupil relay 514 re-images the pupil back to the back-scan mirror 540, which implements the step-stare function as discussed above.

For back-scanned systems such as that shown in FIG. 5, the optimal angular field mapping according to certain aspects is applied to the afocal optics 510 only, not to the imager 520. The optimal angular field mapping ensures that the chief rays from the imager 520 are undeviated in object space (due to the afocal optics 510) during the back-scan operation. The distortion mapping of the imager 520 is independent. In certain examples, such as infrared search applications, and as shown in FIG. 5, the optical imaging system 500 includes multiple afocal stages on the object space side of the back-scan mirror 530. In such cases, the corrections to implement the optimal angular field mapping should correct the entire afocal system as an ensemble. The anamorphic elements used to implement the correction can be located in any of the afocal stages. However, because the optimal field mapping is not rotationally symmetric, it is important to maintain the desired relative orientations of the back-scan operation and the correcting optical elements if image rotations occur in the system.

As discussed above, because the optimal field mapping is not rotationally symmetric, the field correction must be implemented with non-rotationally symmetric optical elements. Additionally, because the optimal field mapping is not rotationally symmetric, the back-scan direction must be oriented correctly with respect to the corrected afocal optics. As noted above, the presented equations assume that the back-scan is in the azimuth direction; adjustments must be made to instead design the correcting surfaces for scanning in the elevation direction, as will be readily appreciated by those skilled in the art, given the benefit of this disclosure. In certain examples, it is desirable that the telescope 512 has a rotationally symmetric distortion mapping (typical of on-axis telescope designs) because the image rotates through its field of view. Accordingly, the optimal angular field mapping of Equations (3) and (4), as associated anamorphic field corrections, can be implemented by one or more optical element(s) in the pupil relay 514 because the derotation element 516 that precedes it corrects the image orientation. However, a variety of other configurations can be implemented. For example, in configurations where the afocal optics 510 is designed such that the optical elements contribute to the distortion field in a symmetric manner (e.g., an on-axis design with rotationally symmetric optics), the anamorphic field correcting elements that implement the optimal field mapping can be rotated about the optical axis to match the image rotation caused by the head mirror 530. In another example, an off-axis (in field or aperture) afocal telescope 512 (e.g., a three-mirror or four-mirror anastigmat) can be used and corrected to effectively have a rotationally symmetric field mapping. In this case, the pupil relay 514 can be configured to compensate the afocal telescope 512 to give the desired field mapping for the entire afocal optics 510. In another example, an off-axis (in field or aperture) afocal telescope 512 can be used, along with one or more rotating elements in the pupil relay 514 or adaptive optics configured to correct the field-dependent mapping of the telescope 512 such that the afocal optics 510 as a whole has the desired optimal angular field mapping of Equations (4) and (4).

Figure 6:
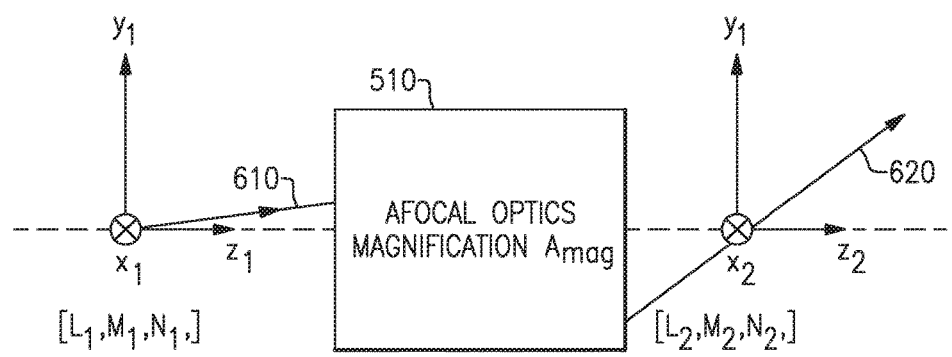
FIG. 6 is a block diagram showing a ray and its direction cosines (L, M, N) before and after the afocal optics of the system of FIG. 5.

According to certain embodiments, there is provided a method of applying the optimal field mapping of Equations (3) and (4) to optical design, so as to construct a system such as that shown in FIG. 5, and other examples of back-scanned optical systems configured to have greatly reduced image wander during back-scanning. FIG. 6 is a schematic diagram showing rays 610 and 620 entering and exiting the afocal optics 510. The vectors $[L_1, M_1, N_1]$ and $[L_2, M_2, N_2]$ describe the directions cosines of the chief ray on the input and output sides of the afocal optics 510, respectively. It is preferable to define the optimal field mapping in such a way that relates the values of $L_2$ and $M_2$ to the values of $L_1$ and $M_1$ because these direction cosines are easily obtained using industry standard ray-tracing codes. Thus, $$M_2 = \sin[A_{mag}\sin^{-1}(M_1)] \quad (5)$$

$$\frac{L_2}{N_2} = \tan\left[A_{mag}\tan^{-1}\left(\frac{L_1}{N_1}\right)\right] \quad (6)$$

$$N_2 = \sqrt{\frac{1-M_2^2}{1+\left(\frac{L_2}{N_2}\right)^2}} \quad (7)$$

$$\frac{M_2}{N_2} = \tan[A_{mag}\sin^{-1}(M_1)]\sqrt{1+\tan^2\left[A_{mag}\tan^{-1}\left(\frac{L_1}{N_1}\right)\right]} \quad (8)$$

$$L_2 = \tan\left[A_{mag}\tan^{-1}\left(\frac{L_1}{N_1}\right)\right]\sqrt{\frac{1-M_2^2}{1+\tan^2\left[A_{mag}\tan^{-1}\left(\frac{L_1}{N_1}\right)\right]}} \quad (9)$$

Equations (5) and (9) can be used to determine the desired direction cosine values $L_2$ and $M_2$ for the ray 620 in image space given the direction cosines $L_1$ and $M_1$ for the ray 610 in object space. These equations allow a designer to optimize the afocal optics 510 for the desired distortion mapping.

Equations (5)-(9) can be rewritten to show:

$$\tan(\bar{\theta}_x) = \tan(A_{mag}\theta_x) \quad (10)$$

$$\tan(\bar{\theta}_y) = \tan\left[A_{mag}\sin^{-1}\left(\frac{\tan(\theta_y)}{\sqrt{1+\tan^2(\theta_x)+\tan^2(\theta_y)}}\right)\right]\sqrt{1+\tan^2(A_{mag}\theta_x)} \quad (11)$$

Equation (11) demonstrates that there is a cross-coupling of terms, indicating, as discussed above, that the optimal angular field mapping is not rotationally symmetric and has an anamorphic nature.

As discussed above, in certain examples, the optical angular field mapping can be implemented in the pupil reimager 514; however, as the correction should take into account the telescope 512 as well, the term $A_{mag}$ refers to the afocal magnification of the afocal optics 510 as a combination. The telescope 512 and/or the pupil reimager 514 can have not unity magnification.

Figure 7:
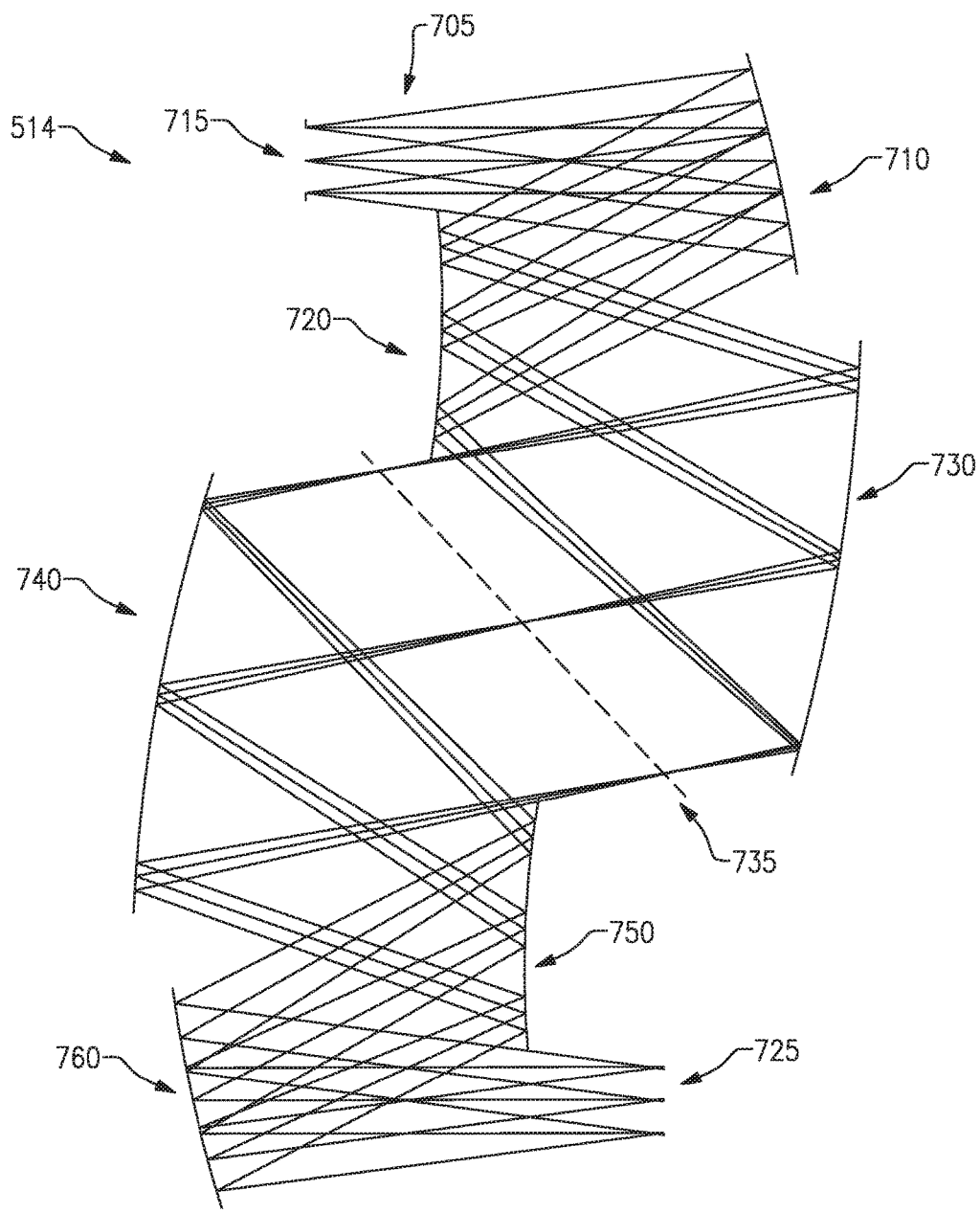
FIG. 7 is a partial ray trace of one example of an afocal pupil relay configured to implement an optimal angular field mapping according to aspects of the present invention.

Referring to FIG. 7, there is illustrated a partial ray trace of one example of an unobscured, all-reflective, afocal pupil relay 514 configured to implement the optimal angular field mapping according to certain embodiments. In this example, the afocal pupil relay 514 includes six anamorphic field-correcting mirrors. A first mirror 710 receives electromagnetic radiation 705 from the exit pupil 715 of the telescope 512 and reflects the radiation onto a second mirror 720. The second mirror 720 reflects the radiation onto a third mirror 730, which in turn reflects the radiation onto a fourth mirror 740. The fourth mirror 740 reflects the radiation onto a fifth mirror 750, which in turn reflects the radiation onto a sixth mirror 760. The sixth mirror 760 reflects and collimates the radiation to an output or relayed pupil 725. The back-scan mirror 540 can be positioned at or close to the location of the relayed pupil 725. The pupil relay 514 is afocal, and thus receives and outputs collimated electromagnetic radiation. Accordingly, the electromagnetic radiation 705 is collimated at both the exit pupil 715 of the telescope 512 and the relayed pupil 725 (exit pupil of the afocal pupil relay 514). In the illustrated example, the first three mirrors 710, 720, 730 of the pupil relay 514 are configured to focus the electromagnetic radiation 705 to form an intermediate image plane 735 between the third and fourth mirrors, 730, 704, and the remaining three mirrors 740, 750, 760 recollimate the electromagnetic radiation and direct the collimated beam to the relayed pupil 725. This design provides the advantage of an accessible intermediate image plane 735, where a field stop can be located, for example. In certain examples, the intermediate image plane 735 is advantageously not located on a mirror surface to avoid mirror imperfections from degrading the image quality.

In one embodiment, the afocal pupil relay 514 has a nearly symmetric design, with four unique mirror shapes. In one such example, as shown in FIG. 7, the sixth mirror 760 is a copy of the first mirror 710. This design has the advantage that only five, rather than six, different mirror shapes need be manufactured. In one embodiment, all six mirrors of the afocal pupil relay 514 are so-called "free-form" mirrors, that is, they have conic surface shapes with general polynomial (aspheric) departures. Conventional afocal pupil relays may include fewer than six mirrors and have various configurations different from that shown in FIG. 7. Examples of the afocal pupil relay 514 disclosed herein differ from conventional pupil relays in that the mirrors of the afocal pupil relay 514 have anamorphic surface shapes configured to implement the prescribed optimal angular field mapping disclosed herein, and to provide a wide field of view. In addition, the six mirrors included in examples of the afocal pupil relay 514 provide sufficient degrees of freedom to implement the optimal angular field mapping. Pupil relays having fewer mirrors (e.g., a conventional four mirror pupil relay) may have insufficient degrees of freedom to implement the optima field mapping disclosed herein.

The equation for the XY Polynomial surface is given by:

$$z = \frac{cr^2}{1+\sqrt{1-(1+k)c^2r^2}} + \sum_{j=2}^{45} C_j x^m y^n \quad (12)$$

Where $x^m y^n$ is the monomial term and j is given by $$j = \frac{(m+n)^2 + m + 3n}{2} + 1 \quad (13)$$

The tables shown in FIGS. 10 and 11 provide an example of an optical prescription for one embodiment of the afocal pupil relay 514 corresponding to FIG. 7 and in accord with the aspects and principles disclosed herein. In this example, the afocal pupil relay includes five minor surfaces (M1-M5), and the first mirror surface (M1) is repeated to provide the sixth mirror in FIG. 7. The table shown in FIG. 11 provides the aspheric coefficients for the various minor surfaces. The optical prescription for this example may be generated using an equation which is an industry standard and which would be known to those skilled in the art. It is to be appreciated however, that the prescription given in FIGS. 10 and 11 is merely exemplary, and that the prescriptions of various embodiments of the afocal pupil relay 514 are determined by the intended task to be performed by the optical system and desired system characteristics. In this example, the entrance pupil (corresponding to the exit pupil 715 of the telescope 512) diameter is one inch, and the afocal pupil relay 514 has unity magnification (i.e., the afocal magnification is 1×). The angular field of view in this example is 14.7° by 14.7°. The diffraction limited performance includes a prescription RMS wavefront error over the field of view of 0.047 micrometers (μm) average, 0.092 μm maximum, and 0.019 μm minimum.

In FIG. 10, the column designated "Radius" provides the base radius of the respective surface, measured in inches. The minus sign indicates that the center of curvature is to the left of the minor surface. The column designated "CC" is the conic constant which is equal to the negative squared value of the eccentricity of a conic section (a planar cut through a double sheeted conic surface). The column denoted "Dec/Tilt Type" indicates whether a decenter in the y-direction ("YDE") and a subsequent tilt ("ADE") about the offset x-axis is implemented and retained ("Basic") or whether the decenter and tilt operation is implemented for the current surface and the coordinate system is returned or restored before propagating to the next surface ("DAR"). The column designated "Thickness" provides the distance between the respective surface and the next surface (identified in the adjacent lower row of the table), measured in inches. The column designated "Material" provides the material of the respective surface, namely either air or a reflective (refl) material). The aperture is defined either as circular with a radius, "Rad", or rectangular with half-width in the x- and y-directions of "Rex" or "Rey", respectively. The center of the aperture is offset in the y-direction by "Yoffset". Equation (12) above defines the surface type of the mirror surfaces identified as "XYP" in the third column of the table in FIG. 10, with the monomial terms and the aspheric constants of the specific mirror surfaces given in FIG. 11.

The afocal pupil relay 514 designed according to FIG. 7 and the optical prescription provided in Table 1 advantageously has low pupil imaging aberrations and a small optical augmentation signature.

Figure 8:
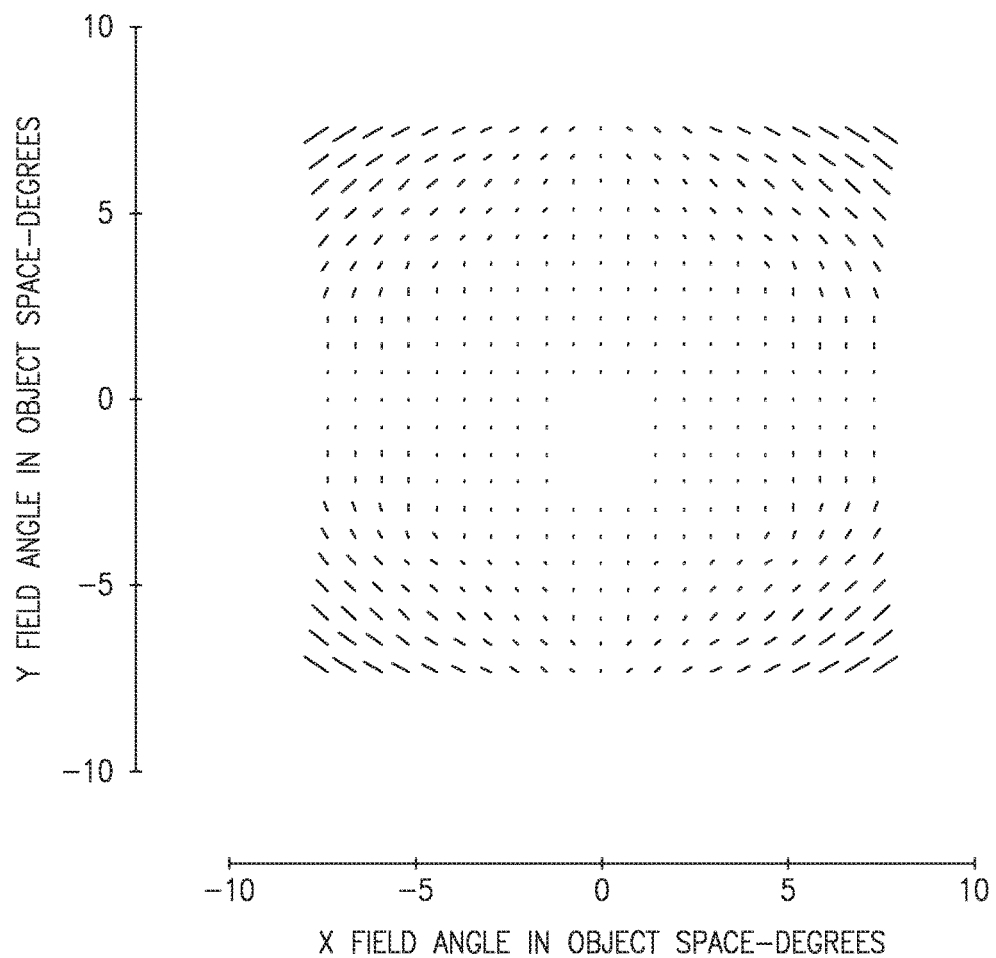
FIG. 8 is diagram illustrating a comparison between the distortion characteristics associated with the optimal field mapping according to aspects of the present invention and the conventional field mapping of Equation (2)

The optimal field mapping disclosed herein can be used to design the afocal optics 510 to significantly reduce image wander during back-scan, while also retaining good distortion characteristics. FIG. 8 illustrates the vector differences between the non-rotationally symmetric optimal field mapping of Equations (3) and (4) and the standard or canonical rotationally symmetric field mapping defined by Equation (2). In the illustrated example, the afocal pupil reimager 514 (with unity magnification) is configured to implement the optimal angular field mapping of Equations (3) and (4), and is paired with an example of the telescope 512 that has a field mapping given by $\theta_i = 4\theta_0$. Thus, the angular magnification ($A_{mag}$) is 4×. In this combination, the optimal angular field mapping matches the desired field mapping to provide sharp images during the back-scan operation. The vector field illustrated in FIG. 8 shows that the optimal field mapping is not circularly symmetric, as discussed above, and therefore must be implemented by optical components having "free-form" surface shapes (generalized aspheres), as in the example discussed above.

Figure 9:
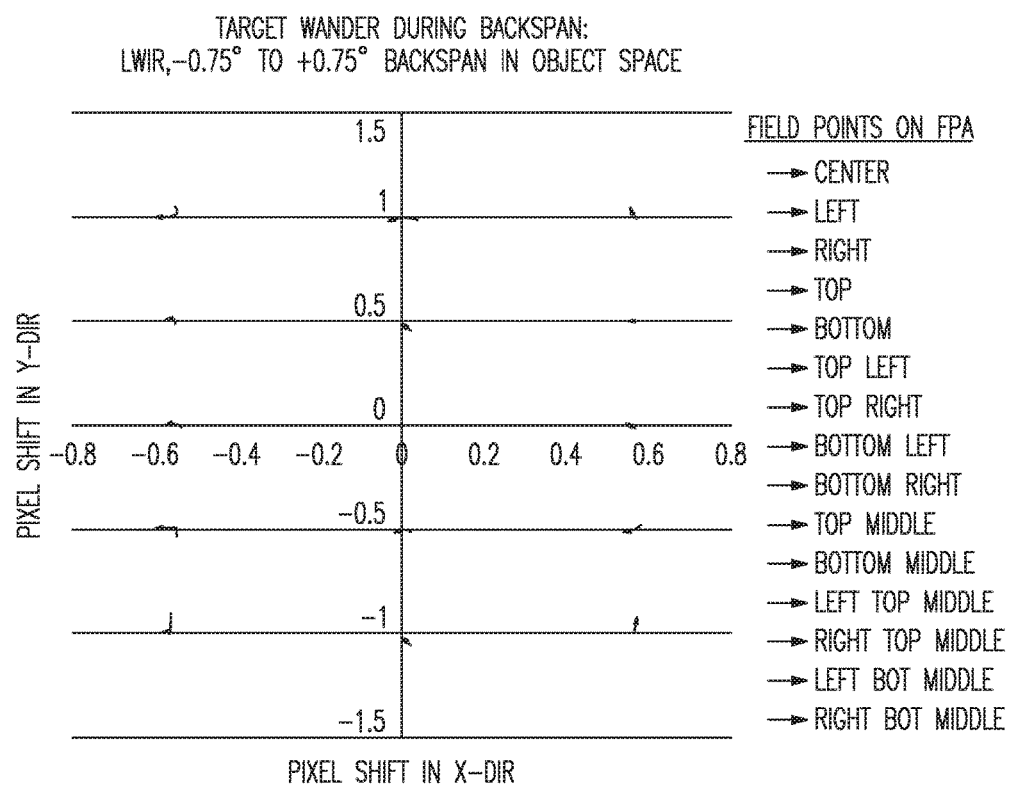
FIG. 9 is a graph illustrating image point wander for the field points of FIG. 3 for the afocal optics of an example of the imaging system shown in FIG. 5 with an example of the afocal pupil relay shown in FIG. 7.

FIG. 9 illustrates the simulated image wander about the nominal positions (for the field points 321-335 of FIG. 3) for an example of the afocal optics 510 shown in FIG. 5, in which the pupil reimager 514 has the configuration shown in FIG. 7 and in configured to implement the optimal angular field mapping of Equations (3) and (4), and the telescope 512 is a five mirror anastigmat. In this example the electromagnetic radiation 705 is in the long-wave infrared (LWIR) spectral band, and the image sensor 560 is a two-dimensional focal plane array (FPA) of size 1280×720 pixels. The back-scan is over −0.75° to +0.75° in object space. The curves in FIG. 9 indicate motion (in units of pixel IFOV) of the chief ray at the various field points during the back-scan operation. The arrows indicate direction of the motion. The maximum image blur during the back-scan is approximately 0.1 pixels.

Thus, according to aspects and embodiments disclosed herein, the problem of image wander during back-scanning may be mitigated by optimizing the imaging distortion of the optics to minimize the effect of image wander at multiple field points and over multiple configurations. This may be accomplished using anamorphic all-reflective optical elements included in the afocal optics, for example, in an afocal pupil relay, as discussed above. The all-reflective implementation may provide advantages such as wide spectral coverage and high radiometric throughput.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and it is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. The scope of the invention should be determined from proper construction of the appended claims, and their equivalents.

What is claimed is:

1. An optical imaging system configured for back-scanned imagery comprising:
   an imaging sensor;
   an imager configured to focus electromagnetic radiation onto the imaging sensor, the imaging sensor being configured to form an image from the electromagnetic radiation;
   afocal optics configured to receive the electromagnetic radiation and to direct the electromagnetic radiation via an exit pupil of the afocal optics to the imager, the afocal optics including an all-reflective telescope configured to receive the electromagnetic radiation and an all-reflective afocal pupil relay positioned between the all-reflective telescope and the exit pupil of the afocal optics and configured to re-image the electromagnetic radiation to the exit pupil, the all-reflective afocal pupil relay including a plurality of anamorphic field-correcting mirrors configured to implement a non-rotationally symmetric field mapping between object space and image space to set distortion characteristics of the afocal optics to control image wander on the imaging sensor for off-axis image points during a back-scan operation; and
   a back-scan mirror positioned proximate the exit pupil of the afocal optics and between the afocal optics and the imager, and configured to perform the back-scan operation to stabilize the image on the imaging sensor.

2. The optical imaging system of claim 1 wherein the all-reflective telescope is configured to implement a rotationally symmetric field mapping.

3. The optical imaging system of claim 1 wherein the all-reflective telescope is a five mirror anastigmat.

4. The optical imaging system of claim 1 further comprising a head mirror positioned on the object space side of the afocal optics and configured to scan a field-of-view of the telescope over a field of regard larger than the field of view.

5. The optical imaging system of claim 4 wherein the afocal optics further includes a derotation element positioned between the all-reflective telescope and the all-reflective pupil relay.

6. The optical imaging system of claim 1 wherein the plurality of anamorphic field-correcting mirrors of the all-reflective afocal pupil relay includes six mirrors.

7. The optical imaging system of claim 6 wherein at a mirror surface of at least one of the six mirrors has a non-rotationally symmetric aspherical departure.

8. The optical imaging system of claim 7 wherein the six mirrors include a first pair of identical mirrors, a second pair of identical mirrors, and two additional mirrors having unique surface shapes different from both the first and second pairs of mirrors.

9. The optical imaging system of claim 6 wherein six mirrors includes a first group of three mirrors configured to receive the electromagnetic radiation and to form an intermediate image, and a second group of three mirrors configured to direct and recollimate the electromagnetic radiation from the intermediate image to the exit pupil to provide a collimated beam of the electromagnetic radiation at the exit pupil.

10. The optical imaging system of claim 1 wherein the non-rotationally symmetric field mapping is defined by $\theta_i = A_{mag}\theta_0$ and $\phi_i = A_{mag}\phi_0$, wherein $\theta_i$ and $\phi_i$ are ray angles in image space, $\theta_o$ and $\theta_o$ are ray angles in object space, and $A_{mag}$ is a magnification of the afocal optics.

11. The optical imaging system of claim 1 wherein the imaging sensor is a focal plane array having a two-dimensional array of imaging pixels.

12. An all-reflective afocal pupil relay configured to implement non-rotationally symmetric field mapping between object space and image space, the all-reflective afocal pupil relay comprising:
   a first mirror configured to receive collimated electromagnetic radiation from an entrance pupil of the all-reflective afocal pupil relay and to reflect the electromagnetic radiation;
   a second mirror configured to receive the electromagnetic radiation reflected from the first mirror and to further reflect the electromagnetic radiation;
   a third mirror configured to receive the electromagnetic radiation reflected from the second mirror and to reflect and focus the electromagnetic radiation to form an intermediate image at an intermediate image plane;
   a fourth mirror configured to receive the electromagnetic radiation from the intermediate image plane and to further reflect the electromagnetic radiation;
   a fifth mirror configured to receive the electromagnetic radiation reflected from the fourth mirror and to further reflect the electromagnetic radiation; and
   a sixth mirror configured to receive the electromagnetic radiation reflected from the fifth mirror and to recollimate the electromagnetic radiation to provide a collimated beam of the electromagnetic radiation at an exit pupil of the all-reflective afocal pupil relay;

wherein each of the first, second, third, fourth, fifth, and sixth mirrors has a conic surface with an aspheric departure to implement the non-rotationally symmetric field mapping.

13. The all-reflective afocal pupil relay of claim 12 wherein the first and sixth mirrors are identical.

14. The all-reflective afocal pupil relay of claim 13 wherein the second and fifth mirrors are identical.

15. The all-reflective afocal pupil relay of claim 12 wherein the non-rotationally symmetric field mapping is defined by $\theta_i = A_{mag}\theta_o$ and $\phi_i = A_{mag}\phi_o$, wherein $\theta_i$, and $\phi_i$ are ray angles in image space, $\theta_o$ and $\phi_o$ are ray angles in object space, and $A_{mag}$ is a magnification of afocal optics in which the all-reflective afocal pupil relay is included.

* * * * *

UNITED STATES PATENT AND TRADEMARK OFFICE
CERTIFICATE OF CORRECTION

PATENT NO. : 10,394,007 B2
APPLICATION NO. : 15/785564
DATED : August 27, 2019
INVENTOR(S) : David N. Sitter, Jr.

Page 1 of 1

It is certified that error appears in the above-identified patent and that said Letters Patent is hereby corrected as shown below:

In the Specification

Column 9, Line 51, delete "five minor surfaces" and insert -- five mirror surfaces --.

Column 9, Line 54, delete "various minor surfaces" and insert -- various mirror surfaces --.

Column 10, Line 6, delete "the minor" and insert -- the mirror --.

Signed and Sealed this
First Day of October, 2019

Andrei Iancu
*Director of the United States Patent and Trademark Office*